US012449978B2

(12) United States Patent
Meeramohideen Mohamed et al.

(10) Patent No.: US 12,449,978 B2
(45) Date of Patent: Oct. 21, 2025

(54) ACCESS HEATMAP IMPLEMENTATIONS AT A HOST DEVICE

(71) Applicant: Micron Technology, Inc., Boise, ID (US)

(72) Inventors: Nabeel Meeramohideen Mohamed, Round Rock, TX (US); Steven Andrew Moyer, Round Rock, TX (US); David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 267 days.

(21) Appl. No.: 17/831,242

(22) Filed: Jun. 2, 2022

(65) Prior Publication Data
US 2023/0393744 A1 Dec. 7, 2023

(51) Int. Cl.
*G06F 3/06* (2006.01)

(52) U.S. Cl.
CPC .......... *G06F 3/0611* (2013.01); *G06F 3/0653* (2013.01); *G06F 3/0659* (2013.01); *G06F 3/0679* (2013.01); *G06F 2212/7207* (2013.01)

(58) Field of Classification Search
CPC .... G06F 3/0659; G06F 3/0604; G06F 3/0679; G06F 3/061; G06F 3/0653; G06F 2212/7207

See application file for complete search history.

(56) References Cited

U.S. PATENT DOCUMENTS

| | | | |
|---|---|---|---|
| 2007/0180186 A1* | 8/2007 | Cornwell | G06F 12/023 711/170 |
| 2014/0215129 A1* | 7/2014 | Kuzmin | G06F 12/0246 711/103 |
| 2014/0325121 A1* | 10/2014 | Akutsu | G06F 3/0683 711/103 |
| 2021/0064543 A1* | 3/2021 | Yang | G06F 12/0253 |
| 2021/0133095 A1* | 5/2021 | Kim | G06F 12/0871 |

* cited by examiner

*Primary Examiner* — Kalpit Parikh
(74) *Attorney, Agent, or Firm* — Holland & Hart LLP

(57) ABSTRACT

Methods, systems, and devices for access heatmap implementations at a host device are described. A host device may leverage access operation monitoring that is performed at a memory device, including various examples of signaling and management of monitoring configurations. For example, a memory device may maintain a storage location for tracking access operation occurrence, for which access operations of a given address may be mapped to multiple fields, and for which each field may be associated with access operations of a respective subset of the addresses. In some examples, such registers may be configured or accessed based on indications (e.g., commands, requests) from a host device, which may support dynamic access operation monitoring that is responsive to various operating conditions. In some examples, the host device may perform evaluations based on such minimum values associated with respective addresses to determine a distribution of data across various portions of memory.

25 Claims, 6 Drawing Sheets

1

ACCESS HEATMAP IMPLEMENTATIONS AT A HOST DEVICE

FIELD OF TECHNOLOGY

The following relates to one or more systems for memory, including access heatmap implementations at a host device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
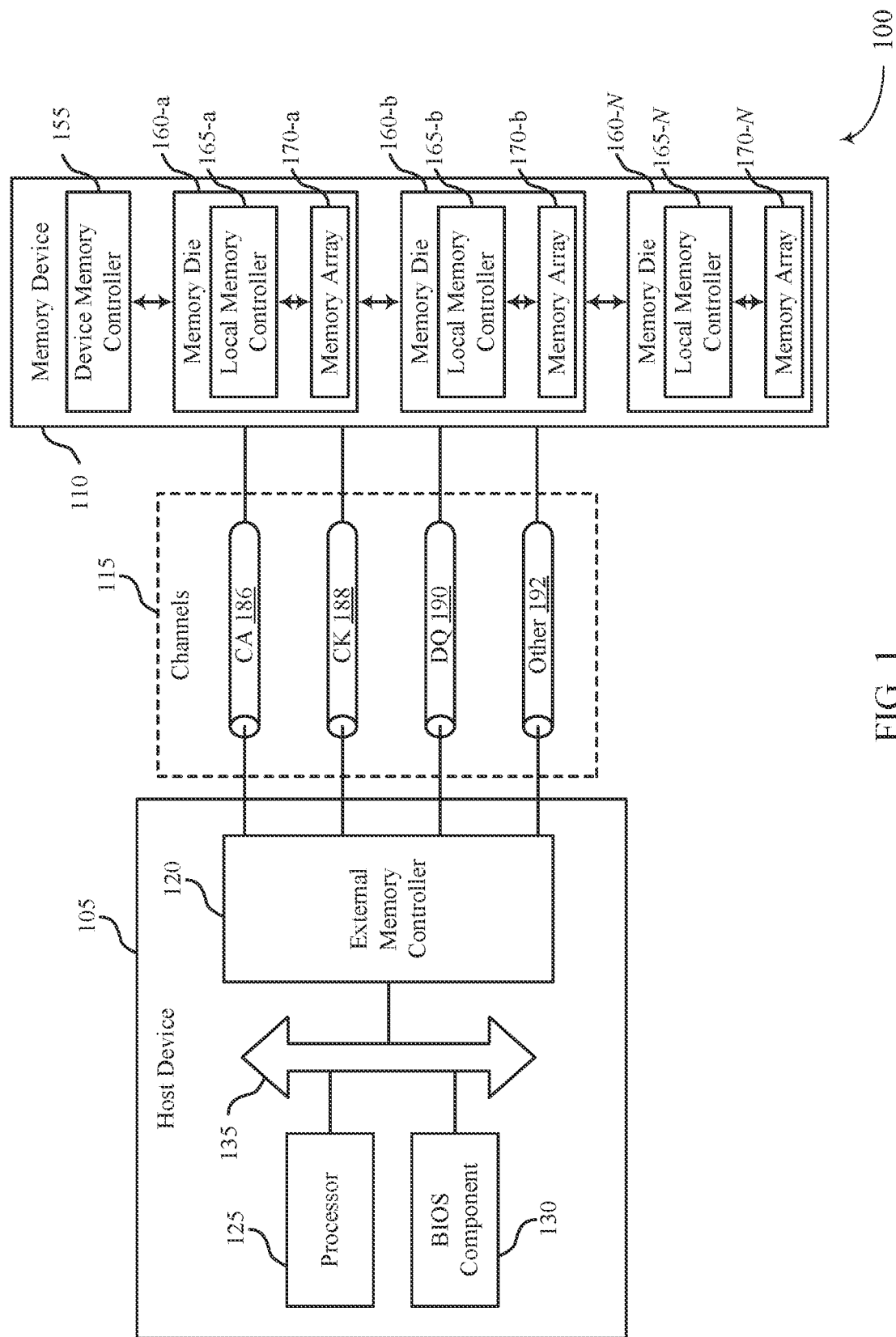
FIG. 1 illustrates an example of a system that supports access heatmap implementations at a host device in accordance with examples as disclosed herein.

In some memory implementations, a host device and one or more memory devices coupled with the host device may be configured to support a monitoring of access operation occurrence (e.g., a quantity of access operations, a quantity of read operations, a quantity of write operations, a count of operations, a frequency of operations) for data stored at a memory device. For example, a memory device may include a table having entries for each address of data (e.g., each page of data), and may set (e.g., adjust, increment) an entry of the table upon performing an access operation at the corresponding address (e.g., in response to an access command). However, such a table may occupy storage resources of the memory device (e.g., associated with a quantity of entries of the table), or may involve a processing load or a signaling load of the memory device (e.g., to maintain the table, to communicate information of the table), among other resource usage. Additionally, or alternatively, a host device may include a table having a flag for each address of data (e.g., an indication of recent access) and, based on transmitting a command to access an address of the data, the host device may set the corresponding flag to indicate that the address was accessed. However, such techniques may not accurately indicate a quantity of access operations (e.g., a quantity of access operations in a sampled time interval), such as if the host device issues multiple access commands for a same address, or if a memory device may be accessed by another host device, among other scenarios.

In accordance with examples as disclosed herein, a host device may be configured to leverage access operation monitoring (e.g., access heatmap information) that is generated at a memory device, including various examples of signaling and management of monitoring configurations. For example, a memory device may be associated with a set of addresses (e.g., memory addresses, logical addresses, physical addresses), and may maintain a storage location, such as a register (e.g., an access count register), for tracking access operation occurrence, for which access operations of a given address (e.g., a given page) of the memory device may be mapped to multiple fields, such as multiple fields of the register (e.g., in accordance with multiple mapping functions for each address), and for which each field may be associated with access operations of a respective subset of the addresses of the memory device. In some examples, such techniques may be complemented by the memory device maintaining a second storage location, such as a second register, having a set of fields that each indicate a respective address that has been recently accessed (e.g., over a sampling interval, in accordance with a first-in-first-out policy). In some examples, such registers may be configured based on indications (e.g., commands, requests) from a host device, which may support dynamic access operation monitoring that is responsive to various operating conditions.

A host device may receive the values of one or more fields, for example of such registers, and may inter relative access frequency of respective addresses of the memory device based on the values of the one or more fields. For example, for implementations in which each field of a register indicates a quantity of access operations associated with a respective set of addresses (e.g., with fields being associated with partially overlapping subsets of addresses), a minimum value of the multiple fields associated with a given address may indicate a highest quantity of access operations that may have been performed on the given address. In some examples, the host device may perform evaluations based on such minimum values associated with respective addresses to determine a distribution of data across various portions of memory. For example, based on values of such registers, the host device may support storing relatively frequently-accessed data (e.g., "hot" data) in a relatively faster portion of memory, such as a cache, and may storing relatively infrequently-accessed data (e.g., "cold" data) in a relatively slower portion of memory, such as in non-volatile memory, among other techniques. In accordance with these and other examples, the described techniques for a host device to leverage access operation monitoring at a memory device may be implemented to reduce resource utilization (e.g., to reduce monitoring storage size or complexity, to reduce monitoring signaling complexity, to reduce monitoring processing load, to reduce monitoring power consumption), or to improve access operation monitoring accuracy, among other advantages compared to other techniques for monitoring access operation occurrence.

Features of the disclosure are initially described in the context of systems and dies as described with reference to FIGS. 1 and 2. Features of the disclosure are described in the context of a system and a process flow as described with reference to FIGS. 3 through 4. These and other features of the disclosure are further illustrated by and described with reference to an apparatus diagram and flowcharts that relate to access heatmap implementations at a host device as described with reference to FIGS. 5 through 6.

FIG. 1 illustrates an example of a system 100 that supports access heatmap implementations at a host device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memoir device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples of the system 100, a host device 105 and one or more memory devices 110 coupled with the host device 105 may be configured to support a monitoring of access operation occurrence (e.g., a quantity of access operations, a quantity of read operations, a quantity of write operations) for data stored at a memory device 110. For example, a memory device 110 may include a table having entries for each address of data (e.g., each page of data), and may set (e.g., adjust, increment) an entry of the table upon performing an access operation for the corresponding address (e.g., in response to an access command). However, such a table may occupy storage resources of the memory device 110 (e.g., associated with a quantity of entries of the table), or may involve a processing load or signaling load of the memory device 110 (e.g., to maintain the table, to communicate information of the table), among other resource usage. Additionally, or alternatively, a host device 105 may include a table having a flag for each address of data (e.g., an indication of recent access) and, based on transmitting a command to access an address of the data, the host device 105 may set the corresponding flag to indicate that the address was accessed. However, such techniques may not accurately indicate a quantity of access operations, such as if the host device 105 issues multiple access commands for a same address, or if a memory device 110 may be accessed by another host device 105, among other scenarios.

In accordance with examples as disclosed herein, a memory device 110 associated with a set of addresses (e.g., of a set of one or more memory dies 160) may include a storage location, such as a register (e.g., an access count register) for tracking access operation occurrence, for which access operations of a given address (e.g., a given page) of the memory device 110 may be mapped to multiple fields, such as multiple fields of the register (e.g., in accordance with multiple mapping functions for each address), and for which each field may be associated with access operations of a respective subset of the addresses of the memory, device 110. For example, in response to a first access operation performed on a first address of the memory device 110, the memory device 110 (e.g., a device memory controller 155, a local memory controller 165) may increment a first field and a second field of the register (e.g., in accordance with a first set of mappings associated with the first address) and, in response to a second access operation performed on a second address of the memory device 110, the memory device 110 may increment the first field and a third field of the register (e.g., in accordance with a second set of mappings associated with the second address). In some examples, such techniques may be complemented by the memory device 110 (e.g., a device memory controller 155, a local memory controller 165) maintaining a second storage location, such as a second register, having a set of fields that each indicate a respective address that has been recently accessed (e.g., over a sampling interval, in accordance with a first-in-first-out policy).

One or more memory devices 110 may provide the values of one or more fields, for example, of such registers to a host device 105 (e.g., to an external memory controller 120), which may infer relative access frequency of respective addresses of the one or more memory devices 110 based on the values of the one or more fields. For example, for implementations in which each field of a register indicates a quantity of access operations associated with a respective set of addresses (e.g., with fields being associated with partially overlapping subsets of addresses), a minimum value of the multiple fields associated with a given address may indicate a highest quantity of access operations that may have been performed on the given address. In some examples, the host device 105 may perform evaluations based on such minimum values associated with respective addresses to determine a distribution of data across various portions of memory included in the one or more memory devices 110. For example, based on values of such registers, the host device 105 may support storing relatively frequently-accessed data (e.g., "hot" data) in a relatively faster portion of memory (e.g., a relatively faster memory device 110 or memory die 160, a relatively higher performance or higher tier memory device 110 or memory die 160), such as a cache, and may storing relatively infrequently-accessed data (e.g., "cold" data) in a relatively slower portion of memory (e.g., a relatively slower memory device 110 or memory die 160, a relatively lower performance or lower tier memory device 110 or memory die 160), such as in non-volatile memory, among other techniques. In some examples, such registers may be configured based on indications (e.g., commands, requests) from a host device 105, which may support dynamic access operation monitoring that is responsive to various operating conditions of the system 100. In accordance with these and other examples, the described techniques for monitoring access operation occurrence at a memory device 110 may be implemented to reduce resource utilization (e.g., to reduce monitoring storage size or complexity, to reduce monitoring signaling complexity, to reduce monitoring processing load, to reduce monitoring power consumption), or to improve access operation monitoring accuracy, among other advantages compared to other techniques for monitoring access operation occurrence.

Figure 2:
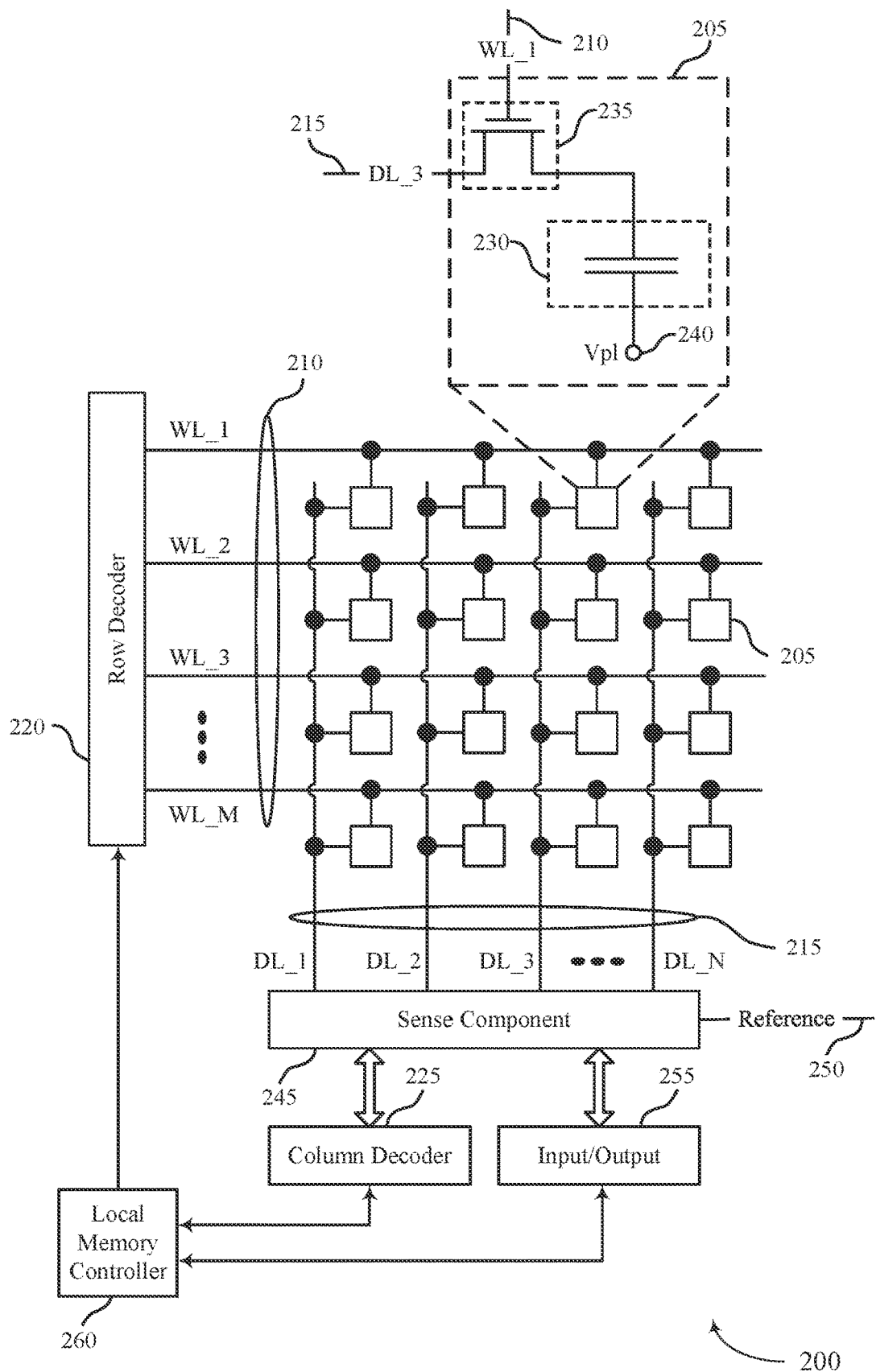
FIG. 2 illustrates an example of a memory die that supports access heatmap implementations at a host device in accordance with examples as disclosed herein.

FIG. 2 illustrates an example of a memory die 200 that supports access heatmap implementations at a host device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss. In other examples of a memory die 200 in accordance with examples as disclosed herein, other storage devices and components are possible. For example, some examples of a memory cell 205 may implement nonlinear dielectric materials in a capacitor 230, such as in a ferroelectric memory architecture. In some other examples, a logic state may be stored as a physical state (e.g., a material state, a resistance state, an atomic arrangement, an atomic distribution) of a programmable material, such as in a material memory architecture (e.g., phase change memory, thresholding memory, MRAM, RRAM). In some other examples, a memory die 200 in accordance with examples as disclosed herein may store one or more logic states using various arrangements of one or more transistors, such as in NAND memory, SRAM memory, and other architectures.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215, By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200, During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

In accordance with examples as disclosed herein, a memory die 200 may be associated with a set of addresses (e.g., pages, row addresses, addresses associated with respective word lines 210 or groups of word lines 210), and the memory die 200 (e.g., a local memory controller 260), or a memory device 110 that includes the memory die 200, may include a register for tracking access operation occurrence, for which access operations of a given address of the memory die 200 may be mapped to multiple fields of the register, and for which each field may be associated with access operations of a respective subset of the addresses of the memory die 200. For example, in response to a first access operation performed on a first address of the memory die 200, a first field and a second field of the register may be incremented and, in response to a second access operation performed on a second address of the memory die 200, the first field and a third field of the register may be incremented. Such techniques may be implemented at the memory die 200, or a memory device 110 that includes the memory die 200, or some combination thereof to reduce resource utilization (e.g., to reduce monitoring storage size or complexity, to reduce monitoring signaling complexity, to reduce monitoring processing load, to reduce monitoring power consumption), or to improve access operation monitoring accuracy, among other advantages compared to other techniques for monitoring access operation occurrence.

Figure 3:
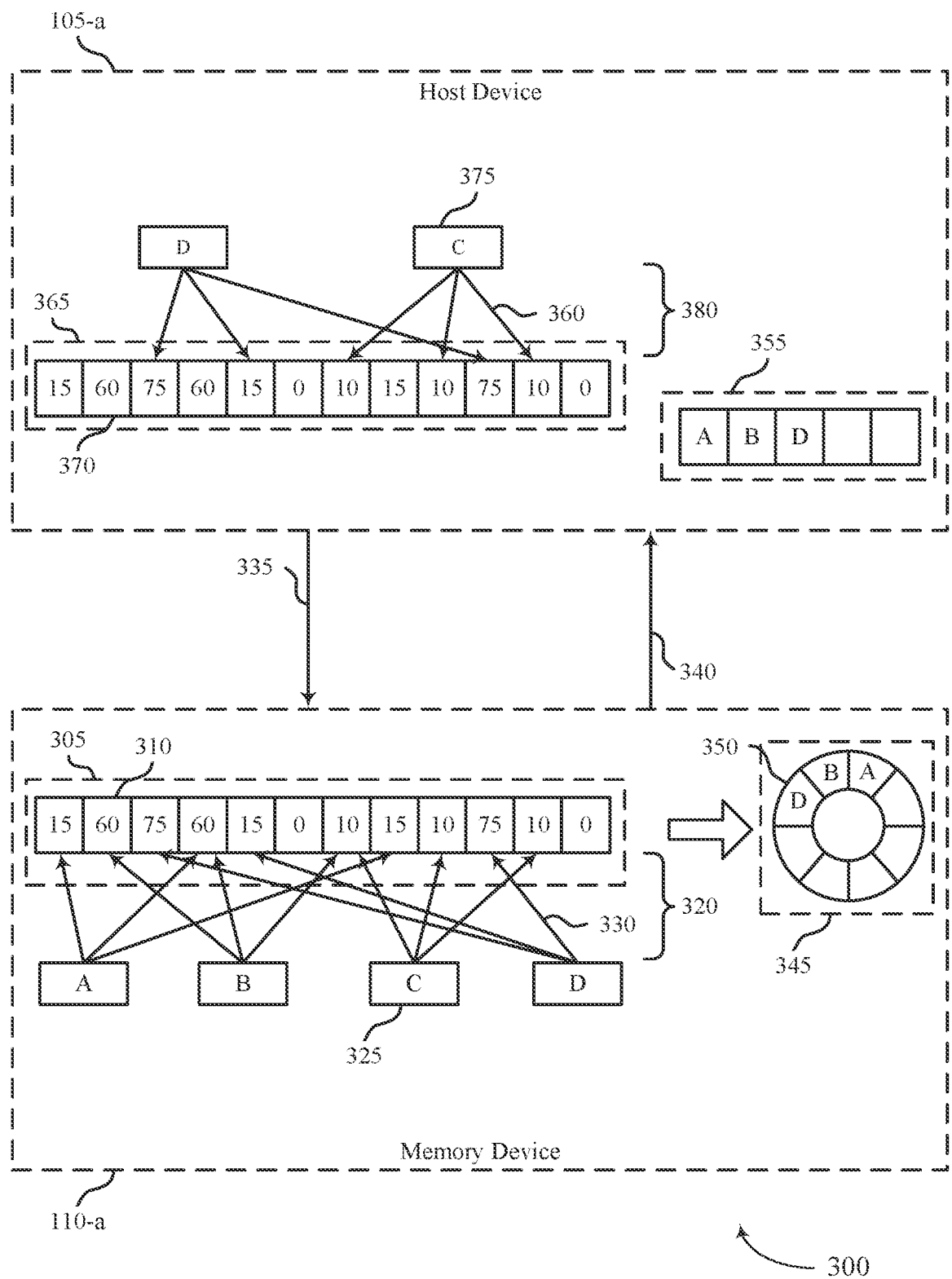
FIG. 3 illustrates an example of a system that supports access heatmap implementations at a host device in accordance with examples as disclosed herein.

FIG. 3 illustrates an example of a system 300 that supports access heatmap implementations at a host device in accordance with examples as disclosed herein. The system 300 may include a host device 105-*a* and a memory device 110-*a*, which may be examples of the corresponding devices described with reference to FIG. 1. In some examples, the system 300 may be configured to support aspects of an industry standard (e.g., a specification, such as a Compute Express Link (CXL) specification), in which case the host device 105-*a* and the memory device 110-*a* may perform operations or signaling in accordance with aspects of the industry standard. Although illustrated with a single memory device 110-*a*, the system 300 may operate in accordance with various memory systems or subsystems, which may include various sets of one or more memory arrays (e.g., memory arrays 170) arranged among memory dies (e.g., memory dies 160, memory dies 200) of one or more memory devices 110, each of which may be associated with various characteristics (e.g., performance tier, access latency, throughput, power consumption, cost).

The memory device 110-*a* and the host device 105-*a* may be configured to monitor access operation occurrence (e.g., a quantity of read operations, a quantity of write operations, a quantity of read operations and write operations, a measure of memory pressure) for units of data stored at the memory device 110-*a*. For example, to support such monitoring, the memory device 110-*a* (e.g., a device memory controller 155, a local memory controller 165) may maintain a register 305 (e.g., an access register, an access count register, a page access register, a page-based heatmap, a page access bloom, a table, an array), which may track a quantity of access commands for various units of data stored at the memory device 110-*a*. The register 305 may include a set of fields 310, each of which may accumulate (e.g., count) a quantity of access operations performed on a respective subset of the units of data associated with the memory device 110-*a* that are being monitored. In some examples, each field 310 may be configured as a counter, which may store a value indicating a quantity of access operations performed on the respective subset of the units of data. The register 305 may be an example of a data structure that supports indicating an access pattern of the memory device 110-*a* (e.g., indicating which addresses have been accessed more often than other addresses).

The register 305 may be operated in accordance with a mapping filter 320 (e.g., access count filter, a mapping tree, a hash tree, a counting bloom filter) that maps each unit of data, associated with a respective identifier 325 (e.g., an index, a page index, an address), with multiple fields 310, For example, the mapping filter 320 may include multiple mapping functions 330 (e.g., k hash functions), such that access operations associated with a given identifier 325 may be mapped to (e.g., accumulated by, counted by) multiple fields 310 (e.g., k fields 310). Each mapping function 330 may be configured to receive an identifier 325 as an input and generate (e.g., using a hashing function) an index of a field 310 as an output. In such examples, each mapping function 330 may be configured to generate an index of a different field 310 for a given identifier 325. Accordingly, each identifier 325 may be associated with a respective set of multiple fields 310 (e.g., a quantity of fields 310 equal to the quantity of mapping functions 330 of the mapping filter 320 or for each identifier 325), and each field 310 may be associated with a respective set of multiple identifiers 325 (e.g., a respective set of multiple addresses). The example of mapping filter 320 illustrates an example with three mapping functions 330 (e.g., k=3), which may correspond to mapping a quantity of access operations of each identifier 325 to three fields 310, but other implementations of a mapping filter 320 in accordance with examples as disclosed herein may include any quantity of two or more mapping functions 330.

The units of data associated with the identifiers 325 may correspond to respective addresses or groups of addresses of the memory device 110-*a*. For example, each identifier 325 may be associated with one or more logical addresses, one or more physical address, or both, either of which may be used (e.g., as an input) for maintaining the register 305. A physical address for a unit of data may correspond to a physical location of a memory array (e.g., a location of a set of memory cells 205, an address of a word line 210 or set of word lines 210) of the memory device 110-*a*. A logical address for a unit of data may correspond to a logical identifier for the unit of data, which may be mapped to one or more physical addresses by way of a logical-to-physical mapping (e.g., an L2P mapping, which may be maintained by the memory device 110-*a*). In some examples, a logical address may be maintained (e.g., held constant) for a remit of data despite the remit of data being moved from one physical address to another (e.g., due to various memory management techniques of the memory device 110-*a*). Accordingly, the host device 105-*a* may include an indication of a logical address for a given access operation, and the memory device 110-*a* may manage aspects of L2P mapping that support the memory device 110-*a* accessing various physical addresses while maintaining a mapping of a given unit of data with a respective logical address.

In some examples, a unit of data associated with each identifier 325 may correspond to a page of data, and an address (e.g., of an access operation) may be used to generate an identifier 325 for the page. In some examples, a bitwise operation (e.g., a bit shift, a right shift operator) may be used on a logical address to generate the identifier 325 associated with the page. For example, an identifier 325 may correspond to a page index, where a page index of a given address (e.g., a physical address, a logical address, a host physical address (HPA)) may be determined based on a bit shift operation on the given address (e.g., discarding some quantity of least significant bits of the given address). In some examples, a page may have a predetermined size (e.g., an amount of data), and the memory device 110-*a* may be configured to monitor and maintain access counts for a range of pages (e.g., a configurable range of pages, a contiguous range of pages). For example, each page may be 4 kilobytes (KiB) in size and 4 KiB aligned, and a page index (e.g., an identifier 325) associated with a given address may be computed by performing a 12-bit right-shift operator on the given address.

In some cases, a page of data may be interleaved across multiple memory arrays (e.g., multiple memory arrays 170) of the memory device 110-*a*. For example, a first portion of the page (e.g., one KiB of data) may be stored in a first memory array, a second portion of the page may be stored in a second memory array, a third portion of the page may be stored in a third memory array, and a fourth portion of the page may be stored in a fourth memory array. In such cases, the HPA, and thus the identifier 325, of each portion of the page may be the same for each memory array. Accordingly, the memory device 110-*a* may reuse the results of a mapping function 330 for each portion of an interleaved page.

The memory device 110-*a* may update the register 305 based on various commands to access the memory device 110-*a*. For example, in response to a command to access an address (e.g., a read command or a write command, which may be a command received from the host device 105-*a* or another host device 105, not shown), the memory device 110-*a* may input the identifier 325 (e.g., the page index) corresponding to the address into the mapping filter 320 (e.g., into the set of mapping functions 330), which may support incrementing the value (e.g., increase the value by one) of each field 310 associated with the identifier 325. In some examples, multiple identifiers 325 may be associated with (e.g., may hash to) a same field 310, such that a value of a field 310 may represent the total quantity of access operations for all of the data units associated with the field 310. Thus, the memory device 110-*a* may support inferring a relative quantity of access operations for a data unit by selecting the minimum value of the set of fields 310 associated with the data unit, which may represent a maximum quantity of access operations associated with the data unit (e.g., assuming that other data units associated with the field 310 having the minimum value were not accessed or were otherwise associated with a zero access count).

In some cases, an error rate for the register 305 (e.g., an accuracy, a probability of the minimum value being greater than the actual quantity of access operations performed on the data unit) may be calculated from the quantity of fields 310 of the register 305, the quantity of mapping functions 330 (e.g., of the mapping filter 320, per identifier 325), the quantity of identifiers 325 being monitored (e.g., the quantity of identifiers 325 of the memory device 110-*a*, or some monitored subset thereof), or any combination thereof. For example, the host device 105-*a* may compute a false positive rate, and may modify parameters of the mapping filter 320 (e.g., via an indication to the memory device 110-*a*) to mitigate the false positive rate.

In some examples, the memory device 110-*a* may monitor a quantity of access operations according to a pre-cache policy or according to a post-cache policy. For example, if the memory device 110-*a* monitors according to a pre-cache policy, the memory device 110-*a* may update the register 305 based on access operations on pages stored in a cache of the memory device 110-*a* (e.g., cached data) and on pages stored in a main array or other relatively long latency storage of the memory device 110-*a* (e.g., relative to a cache). Additionally, or alternatively, if the memory device 110-*a* monitors according to a post-cache policy, the memory device 110-*a* may not update the register 305 based on access operations performed on pages of data stored in the cache, but may update the register 305 based on access operations performed on pages stored in a main array or other relatively long latency (e.g., relative to a cache) storage.

Additionally, or alternatively, the memory device 110-*a* (e.g., a device memory controller 155, a local memory controller 165) may maintain a register 345. The register 345 may be used to track a set of data units (e.g., addresses) of the memory device 110-*a* for which an access characteristic satisfies a threshold. For example, the register 345 may be used to track some quantity of recently-accessed data units (e.g., N recently-accessed hot pages). The register 345 may include a set of fields 350, which each may be configured to store an indication of an identifier 325. As part of access operation monitoring, the memory device 110-*a* may update the register 345 to reflect which addresses have been frequently accessed during a monitoring period, or recently accessed during a monitoring period, among other access characteristics. In some examples, a register 305 and a register 345 may collectively be referred to as a heatmap maintained or generated by the memory device 110-*a*.

For example, based on an access command for a page of data, the memory device 110-*a* may estimate an access count for the page by identifying a minimum value from the set of fields 310 corresponding to the identifier 325 of the page (e.g., before, during, or after incrementing the se of fields 310). If the minimum value satisfies a threshold (e.g., if the minimum value of the field 310 is greater than or equal to threshold quantity, such as 10 access occurrences), the memory device 110-*a* may add the identifier 325 for the page to the register 345. In some examples, the register 345 may be operated in accordance with a membership filter (e.g., a membership bloom filter) such that, prior to adding an identifier 325 to the register 345, the memory device 110-*a* may determine whether the identifier 325 is already included in the register 345 (e.g., to avoid filling the register 345 with duplicate entries). If the identifier 325 is already included in the register 345, the memory device 110-*a* may refrain from (e.g., suppress) adding the identifier 325 to the register 345. In some examples, the register 345 may be implemented in accordance with a ring buffer policy or other first in first out (FIFO) policy (e.g., a ring buffer of size N to track the N recently accessed hot pages). For example, if the register 345 is full (e.g., if each field 350 of the register 345 includes an identifier 325), the memory device 110-*a* may remove the oldest entry of the register 345 and replace associated field 350 with a new identifier 325.

In some cases, the memory device 110-*a* may not update the register 305, the register 345, or both for each received access command for the monitored set of pages. For example, the memory device 110-*a* may update the register 305, the register 345, or both in accordance with a periodicity or ratio of access operations. That is, the memory device 110-*a* may update the register 305, the register 345, or both once per period of access commands (e.g., once per three access commands, once per four access commands). In some cases, such a periodicity may be referred to as a sampling ratio.

The host device 105-*a* (e.g., an external memory controller 120) may transmit one or more indications 335 (e.g., commands, requests, over one or more channels 115) associated with the monitoring of access operations by the memory device 110-*a*. For example, an indication 335 may include a command to monitor access operation occurrence at the memory device 110-*a* (e.g., to initiate a monitoring period at the memory device 110-*a*, a START_MONITOR command). In some examples, such a command may include a set of parameters (e.g., for at least a monitoring period), which may include an indication of a threshold (e.g., a threshold of access counts for adding an identifier 325 to the register 345, a "hot page" threshold), an indication of one or more types of access operations to monitor (e.g., read operations, write operations, read operations and write operations), an indication of the set of pages to monitor (e.g., an range of addresses corresponding to the set of pages), a size of the register 345 (e.g., a quantity of recently accessed pages to monitor, a quantity of fields 350, a value of N), an indication to monitor pre-cache operations, or an indication to monitor post cache operations, or any combination thereof, among other parameters. In some examples, a size of the register 305 (e.g., a quantity of fields 310) may be configured (e.g., by the memory device 110-a, by the host device 105-a) during a boot operation. In some cases, the quantity of mapping functions 330 (e.g., a value of k) may be determined by the memory device 110-a (e.g., by a memory controller of the memory device 110-a). In some other examples, a size of the register 305, a quantity of mapping functions 330, or both may be included in a set of parameters signaled by the host device 105-a.

In some cases (e.g., during a monitoring period), an indication 335 may include a request for information associated with access operation occurrence at the memory device 110-a (e.g., a request to retrieve information associated with the monitoring period from the memory device 110-a, a READ_MONITOR command). In response to such an indication 335, the memory device 110-a may transmit information 340 (e.g., over one or more channels 115, associated with a monitoring period) to the host device 105-a. In various examples, the information 340 may include an indication of a value of one or more fields 310 of the register 305 (e.g., each field 310 of the register 305, a requested subset of the fields 310, such as the fields 310 associated with an identifier 325 indicated in the request), an indication of the quantity of fields 310 of the register 305, an indication of a size of the fields 310 of the register 305, an indication of a total quantity of access operations (e.g., to support an evaluation of the accuracy or false positive rate of the register 305), an indication of an identifier 325 from one or more fields 350 of the register 345, an indication of a sampling ratio (e.g., to support evaluating a global ranking of pages across different tiers of memory), or any combination thereof. In some examples, a duration over which to perform the monitoring may be determined by the host device 105-a, and may correspond to a duration between a command to monitor access operation occurrence (e.g., a START_MONITOR command) and a request for information associated with access operation occurrence (e.g., a READ_MONITOR command).

Additionally, or alternatively, an indication 335 may include an indication (e.g., a command, a request) to retrieve access operation information for a specified set of pages (e.g., a subset of the monitored set of pages, a READ_MONITOR_PAGE_RANGE). For example, such an indication 335 may include an indication of a se of identifiers 325. In response to such an indication 335, the memory device 110-a may determine an access count value for each data unit (e.g., each page) corresponding to the set of identifiers 325 (e.g., by selecting a minimum value of the set of fields 310 corresponding to each page), and may transmit respective indications of the access count values to the host device 105-a. In some other examples, the memory device 110-a may return values of each field 310 associated with the set of identifiers, which may support the host device 105-a selecting a minimum value for each identifier 325.

In some examples, the host device 105-a may monitor units of data larger than a page size (e.g., larger than 4 KiB). For example, the host device 105-a may configure a page size of the memory device 110-a (e.g., as part of a power-on or booting procedure for the memory device 110-a) to be a multiple of the page size (e.g., a power-of-2 value larger, such as 8 KiB or 16 KiB, within the bounds of a controller of the memory device 110-a). Additionally, or alternatively, the host device 105-a may monitor larger units of data without changing the page size. For example, the host device 105-a may use statistics of access frequencies of a set of pages within a segment of interest, such as a minimum quantity of access operations of the set of pages, a maximum quantity of access operations for the set of pages, a median value of access operations for the set of pages, a mode of the access operations for the set of pages, or any combination thereof.

In some examples, the host device 105-a (e.g., an external memory controller 120, a processor 125) may use the information 340 to generate and store a register 365, a register 355, or both (e.g., corresponding to the portion of the register 305 and the portion of the register 345 included in the information 340, respectively). In some cases, the host device may determine an estimated access count (e.g., an upper bound for the access count) for a unit of data using a identifier 375 (e.g., corresponding to an identifier 325) associated with the unit of data as an input to one or more mapping functions 360, each of which may correspond to (e.g., share a corresponding mapping with) a respective mapping function 330). For example, a mapping filter 380 may use the set of mapping functions 360 to determine the set of fields 370 associated with the identifier 375, and may select an output value (e.g., a minimum value) of the set as the estimated access count. Additionally, or alternatively, the host device 105-a may transmit an indication 335 (e.g., a command) to the memory device to calculate the estimated access count. Accordingly, the memory device 110-a may calculate the estimated access count and transmit the estimated access count to the host device 105-a.

Because the host device 105-a may perform processing steps using the register 365 (e.g., determining estimated access counts or identifying pages to transfer, using processing capabilities of the host device 105-a, or external memory controller 120 or processor 125 thereof), the complexity of implementation at the memory device 110-a may be reduced, such that the memory device 110-a may implement portions of the heatmap generation that may not be performed efficiently or accurately at the host device 105-a. For example, such techniques may reduce complexity at the memory device 110-a by approximating access counts, sampling read accesses or write accesses in short intervals, and delegating at least some of (e.g., a majority of) the heatmap processing to the host device 105. Such techniques also may enable the host device 105-a to monitor access counts for a given range of addresses with higher accuracy than tracking access counts wholly in software. In some examples, the host device 105-a may maintain a ranking of memory pages across multiple memory devices 110 (e.g., the memory device 110-a and other memory devices 110, not shown which may include a mixture of CXL memory devices and non-CXL memory devices). That is, the host device 105-a may generate a list of pages sorted by access count (e.g., ranked) across the multiple memory devices 110. Because the memory device 110-a may track each access operation or access operation per period, the accuracy of the register 305 and, accordingly, the register 365, may be improved. Further, by supporting configuration of the register 305 by one or more indications, such techniques also may enable the host device 105-a to manage such aspects as counter saturation, heatmap accuracy, and other characteristics, which may include various adaptations that are responsive to various operating conditions.

Figure 4:
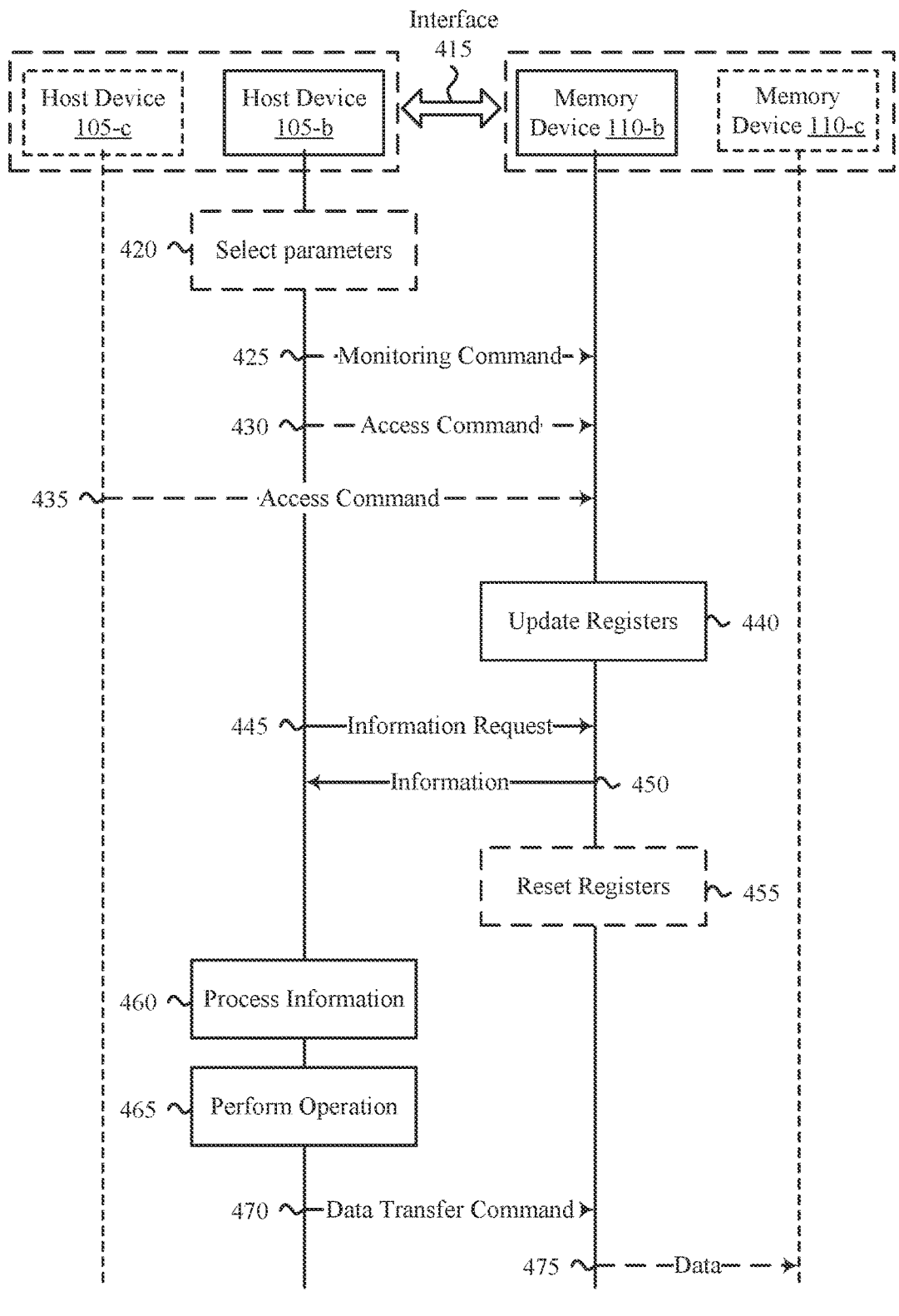
FIG. 4 illustrates an example of a process flow that supports access heatmap implementations at a host device in accordance with examples as disclosed herein.

FIG. 4 illustrates an example of a process flow 400 that supports access heatmap implementations at a host device in accordance with examples as disclosed herein. Operations of the process flow 400 may be performed by one or more host devices 105 (e.g., a host device 105-b, a host device 105-c, or both) and one or more memory devices 110 (e.g., a memory device 110-b, a memory device 110-c, or both), which may be examples of the respective devices described with reference to FIGS. 1 through 3. Aspects of the process flow 400 may be implemented by one or more controllers (e.g., one or more respective controllers at a host device 105 or a memory device 110), among other components. Additionally, or alternatively, aspects of the process flow 400 may be implemented as instructions stored in memory (e.g., respective firmware stored in a memory of or coupled with a host device 105 or a memory device 110). For example, the instructions, when executed by a controller, may cause a controller to perform one or more operations of the process flow 400. In some cases, the one or more host devices 105 and the memory devices 110 may communicate with one another over an interface 415 (e.g., a CXL interface, one or more channels 115).

At 420, in some examples, the host device 105-b may select parameters for monitoring access commands (e.g., at the memory device 110-b, at the memory device 110-c, or both). For example, the host device 105-b may determine a threshold for recently accessed pages (e.g., a threshold of access counts for adding an identifier 325 to a register 345), a quantity of recently access pages to monitor (e.g., at a register 345), types of access operations to monitor (e.g., read operations, write operations, or both), a set of addresses to monitor (e.g., an address range corresponding to a set of pages), whether to monitor pre-cache operations or post cache operations, or any combination thereof.

At 425, in some examples, the host device 105-b may transmit a command to initiate monitoring access operations at the memory device 110-b, which may be received by the memory device 110-b. In some cases, the command may include an indication of one or more parameters selected at 420. Accordingly, the memory device 110-b may initiate monitoring access commands for the set of pages indicated in the first command. For example, the memory device 110-b may allocate a first register having a first set of fields (e.g., a register 305 having fields 310), or a second register having a second set of fields (e.g., a register 345 having fields 350), or both. In some examples, the host device 105-b may send a similar command to the memory device 110-c, which may include similar parameters or different parameters.

At 430, the host device 105-b may transmit one or more commands to access the memory device 110-b (e.g., read commands, write commands, or both). Based on receiving the access commands of 430 (e.g., based on accessing the corresponding addresses), the memory device 110-b may, at 440, update the first register, the second register, or both. For example, the memory device 110-b may input each identifier 325 associated with addresses included in the access commands to a set of mapping functions 330 to determine a corresponding set of fields 310, and may increment a value of each field 310 of the corresponding set. In some examples, the host device 105-c may, at 435, transmit one or more commands to access the memory device 110-b, which also may be responded to by the memory device 110-b updating the first register (e.g., at 440).

In some examples, at 440, the memory device 110-b may update the second register. For example, for each address (e.g., each identifier 325) associated with the access commands of 430, 435, or both, the memory device 110-b may determine an estimated access count (e.g., by selecting a minimum value of the set of fields 310 corresponding to an identifier 325) and compare the estimated access count to a threshold (e.g., a threshold included in the set of parameters of the monitoring command of 425). If the estimated access count exceeds the threshold, the memory device 110-b may add the identifier 425 to the second register (e.g., according to a first in first out policy). In various examples, any of the operations of 430, 435, or 440 may be repeated any quantity of one or more times (e.g., over a monitoring interval).

At 445, the host device 105-b may transmit a request to retrieve information about access operation monitoring, which may be received by the memory device 110-b. In response to the request, at 450, the memory device 110-b may transmit information associated with the monitoring (e.g., associated with a monitoring interval, as monitored over a duration between receiving the monitoring command of 425 and the information request of 445), which may be received by the host device 105-b. For example, the memory device 110-b may transmit an indication of the first register, an indication of the quantity of fields of the first register, an indication of the total quantity of access operations (e.g., a sum of the values of the fields of the first register), an indication of the second register, an indication of the sampling ratio, or any combination thereof.

In some cases, the request of 445 may include a request to retrieve access operation information for a specified set of pages (e.g., a subset of the monitored set of pages). For example, the request of 445 may include an indication of a set of identifiers 325. Upon such a request, the memory device 110-b may determine an estimated access count for each page corresponding to the set of identifiers 325 (e.g., by selecting a minimum value of the set of fields corresponding to each page) and, at 450, the memory device 110-b may transmit an indication of the estimated access counts to the host device 105-b.

In some examples, in response to transmitting the information at 450, the memory device 110-b may, at 455, reset the first register, the second register, or both the first register and the second register. For example, the memory device 110-b may set the value of the fields of the first register to an initial value (e.g., zero). Additionally, or alternatively, the memory device 110-b may initialize the fields of the second register, for example by removing identifiers from fields of the second register.

At 460, the host device 105-b may process the information received at 450. For example, the host device 105-b may determine an access operation count for a selected address of the monitored set of addresses (e.g., by selecting a minimum value of the set of fields 310 to the selected address, where applicable). In some cases, the host device 105-b may, at 465, perform one or more operations based on the information of 460. In some examples, such operations may be configured to improve an allocation of memory resources by the host device 105-b, such as migrating data to improve matching between data characteristics with memory characteristics (e.g., allocating relatively high-tier memory to relatively frequently-accessed data, allocating relatively low-tier memory to relatively infrequently-accessed data).

In some examples, the host device 105-b may divide a range of continuous addresses (e.g., a set of pages having continuous logical addresses) into one or more regions, which may refer to regions of the memory device 110-*b*, or regions of the memory device 110-*b* and one or more other memory devices 110 (e.g., memory device 110-*c*), among other configurations. In some examples, addresses within a region may be assumed to have a similar access pattern, such that the host device 105-*b* may generalize information for a selected address of a region to the entire region. For example, it may be sufficient to monitor access operations of a random address within a region. Thus, the host device 105-*b* may determine access operation information for each address of region by determining access operation information for a selected address from each region, for example by transmitting an indication for access operation information for the selected addresses.

In some such examples, each of multiple memory devices 110 may provide heatmap information to the host device 105-*b* (e.g., access counts, metadata involved with interpreting access counts), and the host device 105-*b* may look up an access count for each address of interest and infer an access count for all the addresses of interest. An alternative that avoids reading an entire register 305 may include the host device 105-*b* querying each memory device 110 with a list of addresses and obtain the access counts for the specified addresses. In some examples, such techniques may support the host device 105-*b* more-accurately monitoring and ranking cold data (e.g., cold pages) to proactively reclaim the right candidate addresses and improve application performance, which may be more accurate than implementations for which the host device 105-*c* tracks a page table entry bit in each sampling interval. In some examples, such techniques may improve efficiency by avoiding kernel page table scans, which may be computationally expensive.

Additionally, or alternatively, the host device 105-*b* may be implemented in a memory hierarchy management system that recognizes tiers of memory (e.g., performance tiers, latency tiers, throughput tiers, cost tiers, or other performance delineation among memory regions). For example, the host device 105-*b* may be coupled with memory devices comprising relatively faster DRAM storage and relatively slower solid state drive (SSD) storage, and the host device 105-*b* may use the information of 450 to perform migration or offload evaluations. In some examples, the host device 105-*b* may maintain multiple lists of addresses, such as a first list that includes addresses (e.g., pages) associated with an active process (e.g., an active application being run by the host device 105-*b*, such as by a processor 125) and a second list that includes idle or unused addresses. The host device 105-*b* may obtain access operation information for the addresses of the first list and the second list (e.g., by querying the memory device 110-*b* or using the information received at 450) and may rank or sort the addresses according to the access counts.

In some examples, the host device 105-*b* may transfer data associated with the addresses based on the access counts. For example, a hot page of the first list or the second list (e.g., an active or inactive page with a relatively high access count) may be transferred from a memory array of the memory device 110-*b* to a faster local memory (e.g., to a cache), while a cold page of the second list (e.g., an inactive page with a relatively low access count) may be transferred from a memory array of the memory device 110-*b* to a separate storage, such as a non-volatile memory device coupled with the host device 105-*b* (e.g., of the memory device 110-*c*). Accordingly, at 470, the host device 105-*b* may transmit a command to the memory device 110-*b* to transfer data associated with the pages based on the access counts from the memory device 110-*b*, which, in various examples, may refer to a transfer between memory arrays of the memory device 110-*b*, or to a transfer between the memory device 110-*b* and another memory device 110 (e.g., the memory device 110-*c*, which may include a relatively higher-tier or relatively lower-tier memory than the memory device 110-*b*). In some examples, in response to receiving the command of 470, the memory device 110-*b* may, at 475, transfer the data to the memory device 110-*c*. In some examples, the relatively finer-granularity monitoring provided by such techniques may support more accurate ranking of hot or cold data in active and inactive kernel least-recently used (LRU) lists, which may support more effective memory offload or migration evaluations than other techniques.

Figure 5:
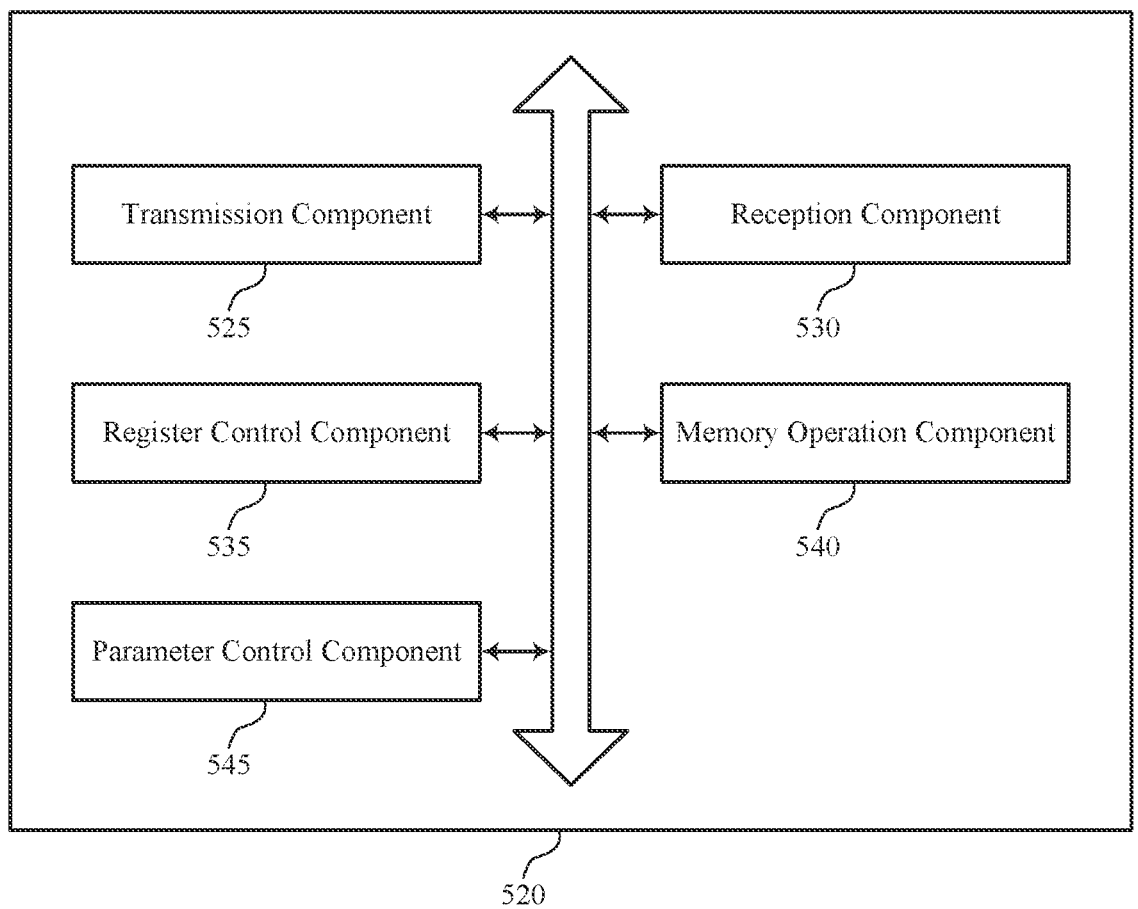
FIG. 5 shows a block diagram of a host device that supports access heatmap implementations at a host device in accordance with examples as disclosed herein.

FIG. 5 shows a block diagram 500 of a host device 520 that supports access heatmap implementations at a host device in accordance with examples as disclosed herein. The host device 520 may be an example of aspects of a host device as described with reference to FIGS. 1 through 4. The host device 520, or various components thereof, may be an example of means for performing various aspects of access heatmap implementations at a host device as described herein. For example, the host device 520 may include a transmission component 525, a reception component 530, a register control component 535, a memory operation component 540, a parameter control component 545, or any combination thereof. Each of these components may communicate, directly or indirectly, with one another (e.g., via one or more buses).

The transmission component 525 may be configured as or otherwise support a means for transmitting, to a memory device including a plurality of addresses, a request for information associated with access operation occurrence at the memory device. The reception component 530 may be configured as or otherwise support a means for receiving, based on transmitting the request, a value of at least one field of a plurality of fields of a register of the memory device, the value of each field of the plurality of fields associated with a respective quantity of access operations of a respective set of multiple addresses of the plurality of addresses, and the respective quantity of access operations of each address of the plurality of addresses included in the value of each field of a set of multiple fields of the plurality of fields respective to the address.

In some examples, the register control component 535 may be configured as or otherwise support a means for determining the set of multiple fields respective to at least one address of the plurality of addresses based on a plurality of hashing operations using an identifier associated with the at least one address.

In some examples, the reception component 530 may be configured as or otherwise support a means for receiving a respective value of at least one second field of a plurality of second fields of a second register of the memory device, where each second field of the second register is associated with an identifier of an address of the plurality of addresses having an access operation occurrence that satisfies a threshold.

In some examples, the transmission component 525 may be configured as or otherwise support a means for transmitting a command to monitor access operation occurrence at the memory device, where the values of the plurality of fields are based on the command.

In some examples, the command includes an indication of a quantity of fields of the register, an indication of a quantity of fields associated with each address of the plurality of addresses, an indication of a duration of monitoring access operation occurrence, an indication of a range of addresses for the plurality of addresses, an indication of a periodicity of monitoring access operation occurrence, or a combination thereof.

In some examples, the parameter control component 545 may be configured as or otherwise support a means for determining a parameter associated with the command based on an accuracy of a value of at least one field of the register. In some examples, the transmission component 525 may be configured as or otherwise support a means for transmitting an indication of the parameter.

In some examples, the transmission component 525 may be configured as or otherwise support a means for transmitting one or more commands to access the plurality of addresses, where the values of the plurality of fields are based on the one or more commands.

In some examples, the register control component 535 may be configured as or otherwise support a means for determining, for an address of the plurality of addresses, a minimum value of the values of the set of multiple fields respective to the address. In some examples, the memory operation component 540 may be configured as or otherwise support a means for performing an operation associated with the address based on the minimum value.

In some examples, to support performing the operation associated with the address, the transmission component 525 may be configured as or otherwise support a means for transmitting a command to transfer data associated with the address from a first memory array of the memory device to a second memory array of the memory device based on the minimum value satisfying a threshold.

In some examples, the first memory array is associated with a first access latency and the second memory array is associated with a second access latency that is greater than the first access latency. In some examples, transmitting the command is based on the minimum value being less than or equal to the threshold.

In some examples, the first memory array is associated with a first access latency and the second memory array is associated with a second access latency that is less than the first access latency. In some examples, transmitting the command is based on the minimum value being greater than or equal to the threshold.

In some examples, to support performing the operation associated with the address, the transmission component 525 may be configured as or otherwise support a means for transmitting a command to transfer data associated with the address from the memory device to a second memory device based on the minimum value satisfying a threshold.

Figure 6:
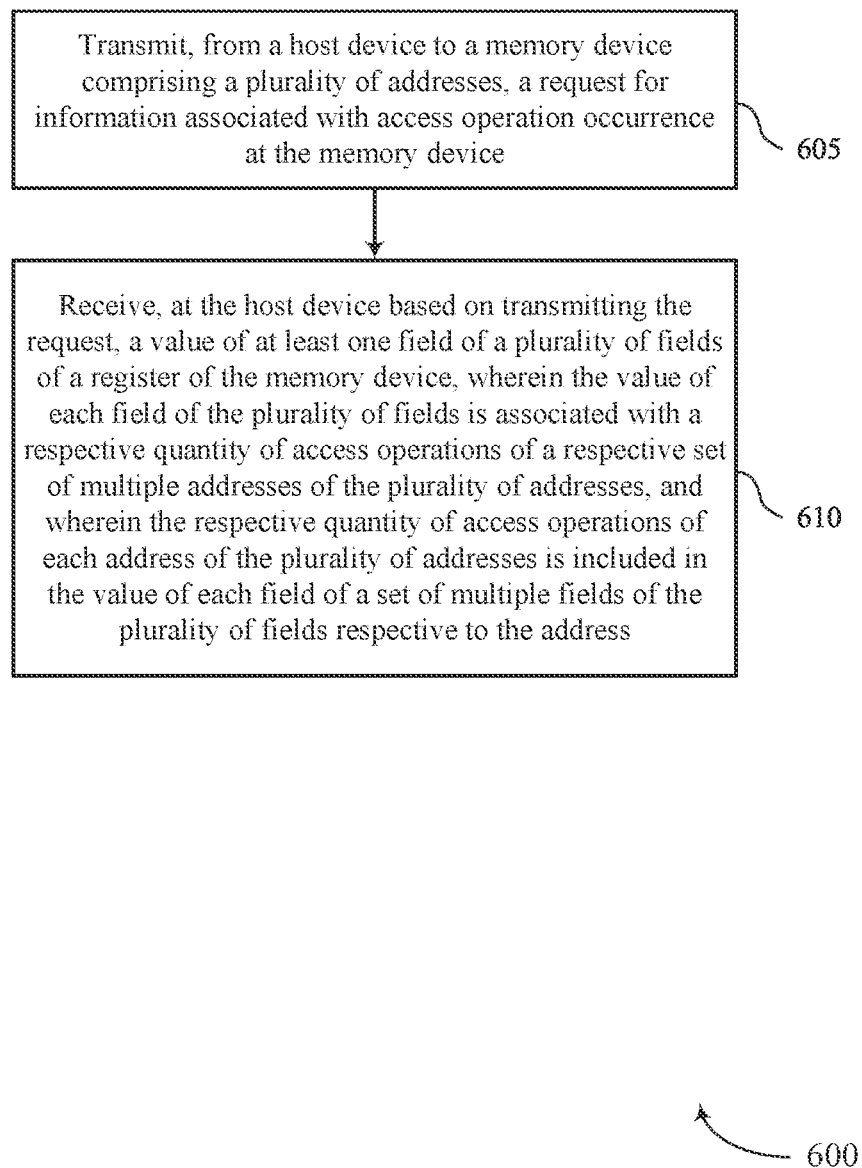
FIG. 6 shows a flowchart illustrating a method or methods that support access heatmap implementations at a host device in accordance with examples as disclosed herein.

FIG. 6 shows a flowchart illustrating a method 600 that supports access heatmap implementations at a host device in accordance with examples as disclosed herein. The operations of method 600 may be implemented by a host device or its components as described herein. For example, the operations of method 600 may be performed by a host device as described with reference to FIGS. 1 through 5. In some examples, a host device may execute a set of instructions to control the functional elements of the device to perform the described functions. Additionally, or alternatively, the host device may perform aspects of the described functions using special-purpose hardware.

At 605, the method may include transmitting, from a host device to a memory device including a plurality of addresses, a request for information associated with access operation occurrence at the memory device. The operations of 605 may be performed in accordance with examples as disclosed herein. In some examples, aspects of the operations of 605 may be performed by a transmission component 525 as described with reference to FIG. 5.

At 610, the method may include receiving, at the host device based on transmitting the request, a value of at least one field of a plurality of fields of a register of the memory device, wherein the value of each field of the plurality of fields is associated with a respective quantity of access operations of a respective se of multiple addresses of the plurality of addresses, and wherein the respective quantity of access operations of each address of the plurality of addresses is included in the value of each field of a set of multiple fields of the plurality of fields respective to the address. The operations of 610 may be performed in accordance with examples as disclosed herein. In some examples, aspects of the operations of 610 may be performed by a reception component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transmitting, from a host device to a memory device including a plurality of addresses, a request for information associated with access operation occurrence at the memory device and receiving, at the host device based on transmitting the request, a value of at least one field of a plurality of fields of a register of the memory device, wherein the value of each field of the plurality of fields is associated with a respective quantity of access operations of a respective set of multiple addresses of the plurality of addresses, and wherein the respective quantity of access operations of each address of the plurality of addresses is included in the value of each held of a set of multiple fields of the plurality of fields respective to the address.

Aspect 2: The method, apparatus, or non-transitory computer-readable medium of aspect 1, further including operations, features, circuitry, logic, means, or instructions, or any combination thereof for determining the set of multiple fields respective to at least one address of the plurality of addresses based on a plurality of hashing operations using an identifier associated with the at least one address.

Aspect 3: The method, apparatus, or non-transitory computer-readable medium of any of aspects 1 through 2, further including operations, features, circuitry, logic, means, or instructions, or any combination thereof for receiving a respective value of at least one second field of a plurality of second fields of a second register of the memory device, where each second field of the second register is associated with an identifier of an address of the plurality of addresses having an access operation occurrence that satisfies a threshold.

Aspect 4: The method, apparatus, or non-transitory computer-readable medium of any of aspects 1 through 3, further including operations, features, circuitry, logic, means, or instructions, or any combination thereof for transmitting a command to monitor access operation occurrence at the memory device, where the values of the plurality of fields are based on the command.

Aspect 5: The method, apparatus, or non-transitory computer-readable medium of aspect 4 where the command includes an indication of a quantity of fields of the register, an indication of a quantity of fields associated with each address of the plurality of addresses, an indication of a duration of monitoring access operation occurrence, an indication of a range of addresses for the plurality of addresses, an indication of a periodicity of monitoring access operation occurrence, or a combination thereof.

Aspect 6: The method, apparatus, or non-transitory computer-readable medium of any of aspects 4 through 5, further including operations, features, circuitry, logic, means, or instructions, or any combination thereof for determining a parameter associated with the command based on an accuracy of a value of at least one field of the register and transmitting an indication of the parameter.

Aspect 7: The method, apparatus, or non-transitory computer-readable medium of any of aspects 1 through 6, further including operations, features, circuitry, logic, means, or instructions, or any combination thereof for transmitting one or more commands to access the plurality of addresses, where the values of the plurality of fields are based on the one or more commands.

Aspect 8: The method, apparatus, or non-transitory computer-readable medium of any of aspects 1 through 7, further including operations, features, circuitry, logic, means, or instructions, or any combination thereof for determining, for an address of the plurality of addresses, a minimum value of the values of the set of multiple fields respective to the address and performing an operation associated with the address based on the minimum value.

Aspect 9: The method, apparatus, or non-transitory computer-readable medium of aspect 8 where performing the operation associated with the address includes operations, features, circuitry, logic, means, or instructions, or any combination thereof for transmitting a command to transfer data associated with the address from a first memory array of the memory device to a second memory array of the memory device based on the minimum value satisfying a threshold.

Aspect 10: The method, apparatus, or non-transitory computer-readable medium of aspect 9 where the first memory array is associated with a first access latency and the second memory array is associated with a second access latency that is greater than the first access latency and transmitting the command is based on the minimum value being less than or equal to the threshold.

Aspect 11: The method, apparatus, or non-transitory computer-readable medium of any of aspects 9 through 10 where the first memory array is associated with a first access latency and the second memory array is associated with a second access latency that is less than the first access latency and transmitting the command is based on the minimum value being greater than or equal to the threshold.

Aspect 12: The method, apparatus, or non-transitory computer-readable medium of any of aspects 8 through 11 where performing the operation associated with the address includes operations, features, circuitry, logic, means, or instructions, or any combination thereof for transmitting a command to transfer data associated with the address from the memory device to a second memory device based on the minimum value satisfying a threshold.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM. ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   transmitting, from a host device to a memory device comprising a plurality of addresses, a request for information associated with access operation occurrence at the memory device;
   receiving, at the host device based on transmitting the request, respective values of a plurality of fields of a register of the memory device, wherein a respective value of each field of the plurality of fields includes a count of a respective quantity of access operations of a respective set of multiple addresses of the plurality of addresses, wherein the plurality of fields includes a subset of multiple fields that is associated with a same address of the plurality of addresses, and wherein each field of the subset of multiple fields includes a count of a quantity of access operations of the same address of the plurality of addresses; and
   performing one or more data allocation operations based on a value of at least one field of the plurality of fields of the register of the memory device.

2. The method of claim 1, further comprising:
   determining the subset of multiple fields respective to at least one address of the plurality of addresses based on a plurality of hashing operations using an identifier associated with the at least one address.

3. The method of claim 1, further comprising:
   receiving a respective value of at least one second field of a plurality of second fields of a second register of the memory device, wherein each second field of the second register is associated with an identifier of an address of the plurality of addresses having an access operation occurrence that satisfies a threshold.

4. The method of claim 1, further comprising:
   transmitting a command to monitor access operation occurrence at the memory device, wherein the respective values of the plurality of fields are based on the command.

5. The method of claim 4, wherein the command comprises an indication of a quantity of fields of the register, an indication of a quantity of fields associated with each address of the plurality of addresses, an indication of a duration of monitoring access operation occurrence, an indication of a range of addresses for the plurality of addresses, an indication of a periodicity of monitoring access operation occurrence, or a combination thereof.

6. The method of claim 4, further comprising:
   determining a parameter associated with the command based on an accuracy of a value of at least one field of the register; and
   transmitting an indication of the parameter.

7. The method of claim 1, further comprising:
transmitting one or more commands to access the plurality of addresses, wherein the respective values of the plurality of fields are based on the one or more commands.

8. The method of claim 1, further comprising:
determining, for an address of the plurality of addresses, a minimum value of one or more values of the subset of multiple fields respective to the address, wherein performing the one or more data allocation operations comprises performing an operation associated with the address based on the minimum value.

9. The method of claim 8, wherein performing the operation associated with the address comprises:
transmitting a command to transfer data associated with the address from a first memory array of the memory device to a second memory array of the memory device based on the minimum value satisfying a threshold.

10. The method of claim 9, wherein the first memory array is associated with a first access latency and the second memory array is associated with a second access latency that is greater than the first access latency, and wherein transmitting the command is based on the minimum value being less than or equal to the threshold.

11. The method of claim 9, wherein the first memory array is associated with a first access latency and the second memory array is associated with a second access latency that is less than the first access latency, and wherein transmitting the command is based on the minimum value being greater than or equal to the threshold.

12. The method of claim 8, wherein performing the operation associated with the address comprises:
transmitting a command to transfer data associated with the address from the memory device to a second memory device based on the minimum value satisfying a threshold.

13. An apparatus, comprising:
a controller configured to couple with a memory device, wherein the controller is configured to cause the apparatus to:
transmit, to the memory device, a request for information associated with access operation occurrence at the memory device, the memory device comprising a plurality of addresses;
receive, from the memory device based on transmitting the request, respective values of a plurality of fields of a register of the memory device, wherein a respective value of each field of the plurality of fields includes a count of a respective quantity of access operations of a respective set of multiple addresses of the plurality of addresses, wherein the plurality of fields includes a subset of multiple fields that is associated with a same address of the plurality of addresses, and wherein each field of the subset of multiple fields includes a count of a quantity of access operations of the same address of the plurality of addresses; and
perform one or more data allocation operations based on a value of at least one field of the plurality of fields of the register of the memory device.

14. The apparatus of claim 13, wherein the controller is further configured to cause the apparatus to:
determine the subset of multiple fields respective to at least one address of the plurality of addresses based on a plurality of hashing operations using an identifier associated with the at least one address.

15. The apparatus of claim 13, wherein the controller is further configured to cause the apparatus to:
receive an indication of a respective value of at least one second field of a plurality of second fields of a second register, wherein each second field of the second register is associated with an identifier of an address of the plurality of addresses having an access operation occurrence that satisfies a threshold.

16. The apparatus of claim 13, wherein the controller is further configured to cause the apparatus to:
transmit a command to monitor access operation occurrence at the memory device, wherein the respective values of the plurality of fields are based on the command.

17. The apparatus of claim 16, wherein the command comprises an indication of a quantity of fields of the register, an indication of a quantity of fields associated with each address of the plurality of addresses, an indication of a duration of monitoring access operation occurrence, an indication of a range of addresses for the plurality of addresses, an indication of a periodicity of monitoring access operation occurrence, or a combination thereof.

18. The apparatus of claim 16, wherein the controller is further configured to cause the apparatus to:
determine a parameter associated with the command based on an accuracy of a value of at least one field of the register; and
transmit an indication of the parameter.

19. The apparatus of claim 13, wherein the controller is further configured to cause the apparatus to:
transmit one or more commands to access the plurality of addresses, wherein the respective values of the plurality of fields are based on the one or more commands.

20. The apparatus of claim 13, wherein the controller is further configured to cause the apparatus to:
determine, for an address of the plurality of addresses, a minimum value of one or more values of the subset of multiple fields respective to the address, wherein, to perform the one or more data allocation operations, the controller is configured to cause the apparatus to perform an operation associated with the address based on the minimum value.

21. The apparatus of claim 20, wherein, to perform the operation associated with the address, the controller is further configured to cause the apparatus to:
transmit a command to transfer data associated with the address from a first memory array of the memory device to a second memory array of the memory device based on the minimum value satisfying a threshold.

22. The apparatus of claim 21, wherein the first memory array is associated with a first access latency and the second memory array is associated with a second access latency that is greater than the first access latency, and wherein transmitting the command is based on the minimum value being less than or equal to the threshold.

23. The apparatus of claim 21, wherein the first memory array is associated with a first access latency and the second memory array is associated with a second access latency that is less than the first access latency, and wherein transmitting the command is based on the minimum value being greater than or equal to the threshold.

24. The apparatus of claim 20, wherein, to perform the operation associated with the address, the controller is further configured to cause the apparatus to:

transmit a command to transfer data associated with the address from the memory device to a second memory device based on the minimum value satisfying a threshold.

25. A non-transitory computer-readable medium storing code comprising instructions which, when executed by a processor of an electronic device, cause the electronic device to:
- transmit, to a memory device comprising a plurality of addresses, a request for information associated with access operation occurrence at the memory device;
- receive, from the memory device based on transmitting the request, respective values of a plurality of fields of a register of the memory device, wherein a respective value of each field of the plurality of fields includes a count of a respective quantity of access operations of a respective set of multiple addresses of the plurality of addresses, wherein the plurality of fields includes a subset of multiple fields that is associated with a same address of the plurality of addresses, and wherein each field of the subset of multiple fields includes a count of a quantity of access operations of the same address of the plurality of addresses; and
- perform one or more data allocation operations based on a value of at least one field of the plurality of fields of the register of the memory device.

\* \* \* \* \*